3,767,590
METHOD OF PRODUCING NONDETERGENT, AQUEOUS WETTING SOLUTIONS
John Thomas Kenney, Trenton, N.J., assignor to Western Electric Company, Incorporated, New York, N.Y.
No Drawing. Original application Feb. 2, 1970, Ser. No. 8,022. Divided and this application June 21, 1971, Ser. No. 155,285
Int. Cl. B01j *13/00*
U.S. Cl. 252—313 R  2 Claims

ABSTRACT OF THE DISCLOSURE

Aqueous wetting solutions comprise stable colloids, the solid phase of which is a hydrous oxide of one or more selected elements. The solid, particulate phase of the colloid is produced by a controlled hydrolysis and nucleation reaction which continues until solid phase particles having appropriate size and surface chemistry result. Application of the wetting solutions to any known non-wettable surface renders such surface wettable, via deposition of the particles of the solid phase onto the surfaces by short order forces. The rendering of the surfaces wettable is accomplished without effecting a physical or chemical change of the surface.

---

This is a division of application Ser. No. 8,022, filed Feb. 2, 1970, now U.S. Pat. No. 3,657,003.

BACKGROUND OF THE INVENTION

(1) Field of the invention

The present invention relates to, and has as one object thereof, a method of producing aqueous solutions capable of rendering non-wettable surfaces wettable. Moreover, this invention relates to, and has as a further object thereof, methods of treating initially non-wettable surfaces with aqueous solutions so that the surfaces are rendered wettable.

The surfaces treated by the solutions and methods of the present invention may include a wide variety of hard-to-wet or non-wettable items and materials such as substrates for printed circuit or other of metallic patterns, photographic plates and films, synthetic or natural fibers, plastic films, metals or any other material which it may be desired to render wettable. The ability of the solutions and methods of the present invention to render such hard-to-wet or non-wettable surfaces wettable makes possible the realization of a number of desirable objectives including, but not limited to, improved electroless plating and electroplating, and the more even coating of, and increased adhesion to, the treated surfaces by coatings such as metallic patterns, inks, dyes, paints, adhesives, and resins.

(2) Discussion of the prior art

For purposes of the instant disclosure, the terms "wettable," "hydrophilic" or "lyophilic" are used synonymously and interchangeably with each other, as are the opposite terms "non-wettable," "hydrophobic" and "lyophobic." Moreover, wettability, hydrophilicity and lyophilicity are all indicated by the existence of a condition termed "practical wetting."

"Practical wetting" is defined as the ability of a surface to retain, on a substantially macroscopically smooth, unroughened portion thereof, a continuous, thin, uniform layer of a liquid, such as water or other liquid medium, when the surface is held vertically, or in any other orientation. It should be noted that this definition does not *necessarily* refer to, nor depend on, contact angle, surface energy or surface tension. However, when practical wetting occurs, the contact angle goes to or closely approaches 0°. Thus, the term "practical wetting" encompasses all types of wetting, due to whatever cause or causes, that meet the above definition of the term.

The ability of a surface to be wet with a liquid may be desirable or necessary for a variety of reasons in many environments.

Generally speaking, whether a surface is wet or not depends to a great extent on the surface (often termed free-surface or interfacial) energies (S.E.) or tensions ($\gamma$) of (1) the surface to be wet, (2) the liquid with which the surface is to be wet, (3) the surface-liquid interface, and (4) the surface-vapor and liquid-vapor interfaces.

Again in general, and somewhat imprecisely, the occurrence or not of wetting by a liquid of a solid in a vapor environment (e.g., air) may be formulated as follows with respect to surface energies (S.E.):

(1) If: $\text{S.E. sur-liq.} > \text{S.E. sur-liq.} + \text{S.E. sur-liq. interface}$, wetting occurs (2) If: $\text{S.E. sur-liq.} < \text{S.E. sur-liq.} + \text{S.E. sur-liq. interface}$, non-wetting occurs Somewhat more precisely, when a liquid is on a surface, $$\gamma \text{ sur-vap} = \gamma \text{ sur-liq} + (\gamma \text{ liq-vap})(\cos \theta)$$

where $\theta$ is the contact angle. Wetting occurs if $\theta \cong 0°$ and $\cos \theta \cong 1$. Actually, to be more technically accurate just wetting occurs when $$\gamma \text{ sur-vap} \geq \gamma \text{ sur-liq} + \gamma \text{ liq-vap}$$

Thus, water, which has a relatively high surface energy or tension is unable to wet a polytetrafluoroethylene (e.g., Teflon—a trademark of Du Pont) surface or a polyethylene surface, both of which have very low surface energies or tensions. Water, however, will normally wet clean glass which has a rather high surface energy or tension. Surface energies and tensions are extremely difficult to measure in many instances, and are often only qualitatively describable. The reason for this is that there are a large number of factors contributing, often in an unkonwn manner, to the character of surface energies and tensions. Such factors include, inter alia, dispersion forces, hydrogen bonding forces, ionic forces, metallic forces, dipole forces, and others. See Physical Chemistry of Surfaces, by A. W. Adamson, Interscience Publishers (1967); and Adhesion and Adhesives, edited by R. Houwink and G. Salomon, 2nd ed., vol. 1, Elsevier Publishing Company (1965), pp. 29–31.

That the relative surface energies or tensions of a surface and a liquid are favorable to the occurrence of wetting has been traditionally indicated by, among other things, the character of the so-called contact angle and the presence of "spreading."

The contact angle is that angle measured through a liquid droplet between (a) a flat surface on which the liquid droplet resides and (b) a line tangent to the envelope of the droplet where the envelope intersects the surface.

According to one traditional school of thought, a surface is completely wet by a liquid if the contact angle is 0° and only partially wet if the contact angle is finite (i.e., $\theta > 0°$). Complete non-wetting implies a contact angle of 180°. Another traditional school of thought correlates contact angle $> 0°$ with non-wetting, and contact angle $\cong 0°$ with wetting.

A droplet of water on a Teflon surface exhibits a contact angle of about 100°, indicating non-wetting or partial wetting depending on which school is followed; on clean glass at standard pressure and temperature the contact angle of water is about 0°, probably indicating wetting to both schools (although the indication to one school might be that of partial wetting).

Thus, there is some controversy as to the upper limits of contact angle size beyond which a condition of non-wetting is present. This controversy is one reason for the use herein of the term "practical wetting," defined earlier. This controversy is not alleviated by the fact that certain external conditions may alter a situation otherwise agreed on by the two schools of thought. Specifically, although water wets clean glass at standard pressure and temperature, it will often not wet such glass (i.e., $\theta > 0°$) after the glass is outgassed in a high vacuum.

Another indicia of the wetting of a surface by a liquid is "spreading." Specifically, if a drop of a liquid "beads up" and assumes a spherical or nearly spherical shape, the liquid does not wet the surface. On the other hand, if the droplet on the surface spreads out over the surface, the liquid wets the surface. It has usually been observed that where spreading occurs, $$\theta \cong 0°$$

at the surface-liquid interface. Obviously, this test is qualitative, and also presents difficulties where spreading is observed but the contact angle is greater than 0°.

The above definition and use of the term "practical wetting" eliminates differentation of contact angle situations falling between the two extremes of 0° and 180°, or between situations such as that of water on Teflon or on clean glass or on outgassed clean glass. Moreover, the difficulties presented by the concurrence of spreading and of a contact angle greater than 0° are avoided. Instead, if a liquid is retained, in accordance with the above definition, practical wetting is present, contact angle, surface energy and other considerations aside.

Traditionally, at least two approaches have been taken to render normally hard-to-wet or non-wettable surfaces wettable by a liquid. First, the surface energy or tension of the liquid may be sufficiently lowered until it, plus the surface energy of the surface-liquid interface is less than that of the solid surface. In this condition the liquid wets the surface. Second, the surface may be altered in such a way that its surface energy or tension is raised to more than the surface energy of the liquid plus that of the surface-liquid interface. Again, in this condition, the surface is wet by the liquid. Moreover, according to at least one of the traditional views, both approaches yield wetting, because the value of the contact angle is at or close to 0°. Spreading is also present in either case.

A common example of the first general approach of rendering surfaces wettable is the addition of a soap, detergent or other surfactant to the liquid. Such addition actually lowers the surface energy of the liquid to the point whereat a low surface energy surface may be wet thereby.

Some examples of the second method of rendering surfaces wettable include both the use of well-known organic primers (e.g., organic titanates) on the surfaces to be wet or the oxidation of the surfaces.

Organic primers are usually thought of as coating the initially non-wettable surface with a material which is wettable. That is, the initially non-wettable and low surface energy surface is "converted" into a new, higher surface energy surface by being coated with some substance adherent thereto, the new surface (i.e., the coated-on substance) being wettable by selected liquids.

The oxidation of an initially non-wettable surface is similar to the use of the organic primers. Specifically, it is well-known that both the oxides of many materials and carbon-containing compounds have higher surface energies than that of many liquids. Accordingly, the surface may be subjected to strong ultraviolet light, a plasma or a flame to generate on the surface an oxide of the material or, in some cases, a carbon-containing compound. Thus, the surfaces are chemically altered. In effect, a new, chemically different surface has been generated which adherently covers the old surface. This new, chemically different surface is wettable by many liquids.

It should probably be here noted that the wellknown technique of roughening an initially non-wettable surface is somewhat different from the above-described techniques of surface alteration. In fact, according to the traditional views, wetting does not occur when a liquid is put on a roughened, and otherwise non-wettable, surface. Specifically, roughening varies neither the relative surface energies of the surface and liquid nor the contact angle between a droplet of the liquid and the roughened surface but rather works a physical or mechanical change of the surface. That change involves increasing the effective area of the surface so that pores or crevices capable of holding by capillarity the liquid, much like a sponge, are produced. This capillary holding of the liquid permits retention of a film of the liquid on the roughened surface, which is referred to as "apparent wetting" herein. It should be noted that such retention of the liquid on the roughened surface also fails to come within the term "practical wetting" because the surface is not macroscopically smooth.

Wetting is a most complicated phenomenon involving surface and interfacial phenomena which are ill-understood. Accordingly, no exhaustive explanation thereof is attempted here. It is thought, however, that to some extent or other, various mechanisms play a part in wetting. These mechanisms include gas and liquid sorption on the surface, the cleanliness of the surface, short order forces, dispersion forces, ionic forces, metallic forces, dipole forces, the roughness or smoothness of the surface, hydrogen bonding, the so-called electrical double layer (i.e., the Zeta potential), and a wide variety of other chemical, physical, and electrical factors, such as chemisorption and the like.

It is thus apparent that, up to the present, there have been no simple methods of ensuring that a particular surface will be wet by a given liquid. Theoretical and quantitative considerations of wetting are complicated by a seeming infinity of possible factors as well as by the divergence of traditional views regarding the qualitative aspects thereof. Accordingly, from a strictly practical point of view, a universal, simple and easy-to-perform method of ensuring that a surface, any surface, can be wet is quite desirable. Such a method is another object of the present invention.

It should also be emphasized that it has long been hoped possible that practical wetting, as herein defined, may be accomplished by means other than by the traditional techniques (and per the traditional views) which, as mentioned above, involve many complicated considerations. That very possibility has become a reality in accordance with the present invention and objects thereof.

(I) PRINTED CIRCUIT MANUFACTURE

It is commonplace today to generate metallic patterns on electrically insulative substrates. These patterns may find use as electrical circuity or even as decorative formations, or the like. Metallic pattern generation may be effected by a wide variety of methods. Of special importance to the present discussion are methods which include a step of electroless plating, which may be followed by the electroplating or further electroless plating of the electroless pattern. Particular reference is made to (1) standard subtractive etching pattern generation, e.g., as typified by U.S. Patent 3,011,920, and (2) the novel additive method of pattern generation as shown in application Ser. No. 719,976 filed on Apr. 9, 1968, now U.S. Patent No. 3,562,005.

Electroless plating has found great favor with many workers in the art and has, in fact, been known in at least rudimentary form since before 1845 (see symposium of Electroless Nickel Plating published by the American Society for Testing Materials as ASTM Special Technical Publication No. 265 in November of 1959).

(A) Standard substrative etching methods

Standard subtractive etching methods of pattern generation generally involve one of two techniques. In the first technique, an entire substrate is covered with an electroless metal area coating. This area coating may then be etched to the desired pattern, which may subsequently be built up by electroless or electroplating. The etching of the area coating, of course, entails, inter alia, the use of photoresists, exposure and development of the photoresists and etching.

The second technique places a mask (properly exposed and developed photoresist or other mask) on the substrate. The entire assembly—mask surface and exposed portions of the substrate—is electrolessly plated. Next, the mask is removed and the remaining metal pattern may be further plated up, if necessary.

In the standard methods, the electroless plating requires a so-called presensitization or precatalyzation step during which the substrate surface (and in the second technique, the mask surface) to be electrolessly plated with a metal has placed thereon a material, usually metal salt. Typically, the metal salt is dissolved in a solution, a commonplace solution being stoichiometric stannous chloride.

The metal salt, here tin, is capable of reducing from a second solution a second metal dissolved therein as a salt. This second metal is referred to as a sensitizer or a catalyst and the step during which it is reduced on the surface is referred to as sensitization or catalyzation. The second metal is capable of autocatalytically (i.e., electrolessly) reducing a metal from a salt solution thereof without the use of an electrical current.

Sensitization, or catalyzation, is referred to as such because the material used, usually a solution containing stoichiometrically the salt of the precious metals (here defined as palladium, platinum, gold, silver, indium, iridium, rhenium, rhodium), serve as reduction catalysts in the autocatalytic electroless plating process. Often, sensitization is characterized as providing "nucleating sites" onto which the plated metal is "brought down" by a chemical reduction or, more generally, by a redox reaction. See, for example, U.S. Patents 3,119,709, and 3,011,920.

In order for a well-defined circuit pattern to be generated without undesirable discontinuities and irregularities, it is necessary that the metal salt (in the case of a presensitizer) and the nucleating sites (in the case of a sensitizer) are placed on the substrate at desired locations and only there. Thus, the presensitizing and sensitizing solutions must be capable of being accurately put on the substrate.

It has been found that many presensitizers and sensitizer solutions do *not* wet substrates (which are usually plastics or polymers) and that there is, accordingly, great difficulty in achieving precise placement of the nucleating sites where desired. Specifically, the presensitizers and sensitizers often bead up and run after placement on the substrate preventing accurate placement thereof, even where the masks of the second technique are used.

In some cases, whether or not the presensitizer and sensitizer wet the substrate may not be crucial. Specifically, lack of true wetting can at times be ignored *if* the metal salt of the presensitizer and the nucleating sites of the sensitizer sorb on the substrate where desired. Accordingly, there is a most practical reason why stannous chloride and palladium chloride are often selected as a presensitizer or sensitizer, respectfully. Specifically, the metal moieties of both chlorides have the apparent ability to sorb onto some surfaces on which it is desirable to produce printed circuits. Such sorbing *may* occur even though the chloride solutions do not wet the substrate. However, it has been observed that it is quite difficult to achieve sorption of the metal salt and nucleating sites onto the substrate from a solution which does not wet the substrate surface.

It is noteworthy that this sorption mechanism is unpredictable and is achieved with widely varying results even where an appropriate substrate (usually one having a micro-roughened or oxidized surface) has been selected.

For a variety of reasons it may be desirable to use as presensitizers or sensitizers, solutions other than stannous chloride or palladium chloride solutions. For example, a particular substrate, desirable for its electrical or other properties, may not have the ability to sorb tin or palladium ions from a solution thereof. It may also be undesirable to roughen the surface of such a substrate.

While wetting of the substrate by the presensitizer and sensitizer and the adhesion of the final metallic pattern thereto are not, strictly speaking, *directly* related, it has been found that if the presensitizer and sensitizer *do* wet the substrate, there is a *better chance* of good adhesion being effected.

With respect to adhesion, in some circumstances, an adhesive may be used on the substrate to attach a metallic pattern thereto. Adhesives are, however, usually undesirable, because the metallic patterns attached to a substrate by the adhesive often "swim" when heated, e.g., in a soldering process, due to degradation of the adhesive by the heat.

The use of surfactants or of prior art organic primers in presensitizers and sensitizers has generally proven unworkable. Such surfactants often cause undesirable spontaneous reduction of metal, e.g., from the electroless plating solution. Moreover, it is often found that the adhesion between ultimate metallic pattern and the substrates is of poor quality when surfactants or organic primers are used. Such properties of surfactants are usually attributed to their ionic character, although other phenomena may be responsible. Non-ionic surfactants have also been used, but usually with unpredictable and often unsatisfactory results.

Oxidation of the substrate surface may permit that surface to be wet by the presensitizer and sensitizer; good adhesion may also be realized thereby. However, such oxidation may render the substrate brittle. Substrate brittleness is generally undesirable especially where the substrate is intended to support a flexible electrical circuit. Moreover, the electrical properties of the substrate may be deleteriously affected by surface oxidation.

Roughening of the substrate surface may lead not only to the apparent (not "practical") wetting thereof by the presensitizer and sensitizer but also to good adhesion of the metallic pattern thereto. However, thickness variations in the pattern caused by such roughening are usually intolerable, especially if the metallic pattern includes conductors or resistors in the micron or low mil width and/or thickness range.

Accordingly, as is apparent from the above discussion, a universal, simple, predictable and reliable method of wetting substrates would be quite advantageous in standface oxidation, surface roughening, etc.) would be eliminated; Costs (for rejected patterns, surfactants, etc.) could be cut; Advantages (increased adhesion, better product uniformity) would be gained. Such a method is yet a further object of this invention.

(B) The novel additive process

In the novel additive process of metallic pattern generation, as described in Ser. No. 719,976, filed Apr. 9, 1968, now U.S. Pat. No. 3,562,005, and incorporated by reference hereinto, patterns are generated without etching or masking.

Specifically, a solution, called a "photopromoter" which has (or at least a part of which has) the ability to be retained on a substrate is applied to the substrate. The photopromoter is also capable of changing oxidation state upon exposure thereof to appropriate radiation. In one oxidation state the photopromoter is able to reduce, from a salt solution thereof, a precious metal (previously defined). The precious metal, similar to the catalysts of the standard methods described in (A), above, initiate an autocatalytic electroless plating process.

After the substrate retains some of the photopromoter, it is selectivity exposed to the appropriate radiation, rendering some portions of the substrate amenable to reducing the precious metal, and rendering other portions not so capable. Subsequently, electroless metal is deposited *only* where it is desired.

This novel additive process is subject to many of the same difficulties as are the standard processes. Specifically, many potential photopromoters do not wet desirable substrates. Accordingly, it is either difficult or impossible to be sure that the photosensitive and precious-metal-reducing moiety thereof will be retained (by sorption, etc.) on the substrate. Thus, metallic pattern integrity, definition and continuity may be in doubt.

Expedients such as surfactants, surface oxidation, surface roughening, adhesives, etc., are no more desirable than they are with the standard processes, usually for the same reasons.

It would, therefore, be very advantageous to have a universal, simple, predictable and reliable method of ensuring that all desirable photopromoters wet most, if not all, substrates. Such a method would render even more desirable the already superior pattern generation method of the above-mentioned application. Providing just such a method is still another object of the present invention.

(II) COATING SURFACES WITH NON-METALS

Most synthetic fibers and surfaces are comprised of long chain polymers or plastic materials. As discussed previously, such materials have such low surface energies and are not wet by aqueous and other solutions, for example, dyes, inks, etc.

Some synthetic fibers are spun glass. As mentioned previously, clean glass is normally wet by aqueous and other liquids, if the glass is clean. However, spun glass fibers are usually far from clean. Specifically, these fibers are usually coated with processing-aiding elements which are hydrophobic. Such elements are usually organic materials similar in non-wettability to plastics.

Accordingly, the dyeing of all synthetic fibers involves complicated and uncertain procedures similar to those discussed previously, that is, either raising the surface energy of the fibers or lowering the surface energy of the dyes, inks, etc.

With respect to the dyeing of synthetic fibers the technique usually followed is that of using so-called dye mordants. A dye mordant is generally defined as an inorganic material, such as alumina or a clay-related substance, which can be made to adhere (the exact mechanism is usually unspecified) to the fiber to generate, in effect, a "new" surface. The mordant, in turn, adsorbs the dye preferentially. The use of mordants is unpredictable and is often, at best varyingly successful.

It would be desirable to obtain convenient alternatives to the use of dye mordants and to provide, cheap, simple, easy-to-make substances, which are predictably successful in rendering synthetic fibers wettable by dyes.

Also, it is often desirable to coat both aqueous and non-aqueous substances or liquids (such as, inks, paints, and adhesives) onto both synthetic fibers and onto other surfaces, including other plastics and metals. Many of the non-aqueous substances and liquids do not wet the surfaces, leading to uneven and discontinuous coatings or, worse, to no coating at all. Most, if not all, of these non-aqueous liquids will wet a surface which is also wet by water.

It would, therefore, be most convenient if some universal method of rendering all of these surfaces wettable by most, if not all, liquids could be found. In fact, such a universal method is another object of the present invention.

(III) PHOTOGRAPHIC FILMS

In photography, it is often required to put a photosensitive gelatin layer, or the like, on photographic film or paper. The layer must adhere quite tenaciously to the film or paper. In the past, such adherence has been effected by substances intermediate the layer and the film or paper. Such substances have usually comprised complex organic primers, or the like, which tend to have a short shelf life.

A simple method of permitting the film or paper to be wet by, and thus adhere to, the layer is most desirable and is a further object of this invention.

(IV) MISCELLANEOUS

Many seemingly diverse manufacturing processes depend, at least in part, on the surface phenomena, e.g., wetting of particular materials. Better and more convenient ways of carrying out such processes are certainly worthy ends to seek. Anti-soiling agents for cloth and synthetics, coagulating agents for water purification and sewage treatment, and leather-tanning agents are all subject to improvement in such areas as stability, shelf-life and predictability. These and other improvements are also objects of this invention.

SUMMARY OF THE INVENTION

Accordingly, another object of this invention is to provide a novel method of rendering a hydrophobic, or non-wettable, surface hydrophilic, or wettable, which method avoids the problems of the prior art, as discussed above, and which method does not effect a physical mechanical or chemical change of the surface.

The present invention contemplates methods of making and of using novel, aqueous, universal wetting solutions.

Briefly, one, or more than one, element capable of forming an insoluble hydrous oxide is selected. The element is oxidized and a salt thereof is formed. Next the pH and temperature of an aqueous medium are adjusted, if necessary, so that when the salt is dissolved therein, no precipitate or flocculate results. The salt is then dissolved in the medium. The pH and or temperature of the solution are now adjusted, again if necessary, a hydrolysis and nucleation reaction being thereby permitted to occur at a given rate, for a given time, during which time insoluble colloidal particles of the hydrous oxide of the element are generated. These particles will, upon simple immersion of a non-wettable surface into the solution, affect the surface, possibly by deposition thereon. A surface so treated is rendered wettable, and remains wettable after repeated rinsings and even after drying. Moreover, a surface rendered wettable in accordance with this invention undergoes no visible or detectable chemical or physical change.

DETAILED DESCRIPTION

The first step in the method of making one of the solutions of this invention comprises the slection of one or more of any of the elements capable of forming an insoluble or sparingly soluble hydrous oxide. Typically, this selection is made from the following portions of the Periodic Table:

(1) Alkali and Alkaline Earth Metals—beryllium and magnesium
(2) Transition Metals—all
(3) Boron Family—all except boron
(4) Carbon Family—all except carbon
(5) Nitrogen-Oxygen Family—bismuth
(6) Rare Earth Metals—lanthanum and cerium
(7) Actinide Metals—thorium and uranium The important factor in the selection is the ability of the selected element to form an insoluble or sparingly soluble hydrous oxide. Accordingly, elements other than those listed above, such as other rare earth metals, the other actinides, and other members of the nitrogen-oxygen family, etc., may also be used, if the insolubility criterion is met.

The term "hydrous oxide" is defined for purposes of the present invention as an insoluble oxide, an insoluble hydroxide, an insoluble oxide-hydroxide, or an insoluble mixture of an oxide and a hydroxide.

Moreover, the term "hydrous oxide" as used herein is intended to include all permutations and combinations of one or more of the following types of oxides and/or hydroxides:

(1) True hydrous oxides.—Those oxides which include an indefinite amount of $H_2O$ in other than stoichiometric fashion. That is, a salt of a selected element+hydrous $H_2O$.

(2) True hydroxides.—Those compounds of a salt which contain actual OH-groups. That is, a salt of a selected element+only sufficient stoichiometric $H_2O$ to form a hydroxide.

(3) Hydrous hydroxides.—True hydroxides which also contain hydrous $H_2O$ in indefinite amounts. That is, a salt of a selected element+stoichiometric $H_2O$ necessary to form a hydroxide+hydrous $H_2O$.

(4) Hydrous hydrates.—A salt of a selected element+ some of the stoichiometric $H_2O$ necessary to form a hydroxide+hydrous $H_2O$.

More detailed explanation of the term "hydrous oxide" is contained in both Inorganic Colloid Chemistry by H. B. Weiser, vol. II, "The Hydrous Oxides and Hydroxides," Chapter I, John Wiley and Sons, Inc., New York (1935); and Inorganic Chemistry, An Advanced Textbook by T. Moeller, John Wiley and Sons, Inc., New York (1952).

It should be noted that the term "hydrous $H_2O$" refers to water carried by the compound in other than stoichiometric fashion. Specifically, such water is probably not carried in chemical fashion but is rather surface sorbed, occluded or held as a part of the unit crystal.

The pH of an aqueous medium, adjusted to prevent a precipitate or flocculate upon addition of the selected element or of the salt thereof, may be acid, basic or neutral. Generally, deionized water is desirable but is not necessary, ordinary tap water sufficing if precipitation and flocculation does not occur.

Next, either the selected element or a salt thereof is added to the aqueous medium to produce an aqueous solution containing the dissolved salt of the selected element. Agitation and/or heat may be required to effect complete dissolution. This is especially true where the element in elemental form is added to the aqueous solution.

Next, a hydrolysis and nucleation reaction is permitted or caused to take place at a controlled rate within the solution. This reaction takes place until a hydrous oxide, previously defined, is formed in situ, which hydrous oxide exceeds the solubility limits of the solution. Thus, a two phase system—a colloid—is formed.

Along with the constraint that no precipitate is formed in the aqueous solution, the formation of a hydrous oxide exceeding the solubility limits means that colloidal particles of the hydrous oxide have been produced. The formation of the colloid is hydrolysis rate dependent and nucleation rate dependent.

In some cases mere addition of the salt of the selected element to water effects not only the dissolution of the salt, but also the proper hydrolysis and nucleation rate necessary to the proper formation of the insoluble hydrous oxide colloid. In other cases more must be done to produce the desired colloid. Specifically, if the salt is a strong acid and a weak base, a univalent basic compound (such as NaOH, $NH_4OH$, KOH, etc.) must often be added. If the salt is a strong base and a weak acid, a univalent acidic compound, such as HCl, or the like, must often be added. Divalent acids, such as $H_2SO_4$, or the like, may also be used.

Experimentation has indicated that there are at least two crucial factors in successfully making the wetting solutions of the present invention.

First, the rates of the hydrolysis and nucleation reactions must occur neither too slowly nor too rapidly. It appears that these hydrolysis and nucleation rates must be such as to yield hydrous oxide particles of colloidal size, surface chemistry and insolubility. These rates may be adjusted by both adding the compounds (acid or base), mentioned above, as well as by heating and/or agitation.

Second, the pH of the solution must be maintained at a point whereat no spontaneous precipitation or flocculation occurs. This point, it has been found, is usually a point distant from the isoelectric point. The isoelectric point is that pH level at which precipitation or flocculation occurs because the normally repelling charge on the colloidal particles is neutralized, permitting the particles to aggregate to a degree sufficient for flocculation to occur. The point distant from the isoelectric point, may at times, be quite close thereto, as long as flocculation does not occur. Generally, when the distant point is quite close to the isoelectric point, the colloid includes two hydrous oxides of two or more selected elements; and the distant point is actually quite close to the isoelectric point of only one of the hydrous oxides.

In many cases, the original pH adjustment prior to dissolution of the salt of the selected element permits *only* the proper rate of hydrolysis and prevents flocculation. In other cases, additional pH and/or heat adjustment is necessary.

In any event, an essential of this invention is the production by a controlled hydrolysis and nucleation reaction of an insoluble, colloidal hydrous oxide. It is unclear whether the colloidal particles are individual hydrous oxide particles or whether hydrolytic polymerization has also occurred. In a few cases the character of the colloid is, to some extent, known. For example, a wetting solution of $\beta$-FeOOH (Example X–B) contains colloidal particles which are the result of hydrolytic polymerization. On the other hand, a wetting solution of PdO (Example XIII–A) contains colloidal particles which appear to be aggregates of individual hydrous oxide particles. For purposes of the present invention, particles of colloidal size are those particles which are not only suspended in a stable manner in a liquid medium but also have dimensions within the range 10 A. to 10,000 A. As pointed out by D. J. Shaw (Introduction to Colloid and Surface Chemistry; Butterworths (London), 1968; pp. 1, et seq.), figures specifying colloidal particle size are quite arbitrary because "no sharp distinction can be made between colloidal and non-colloidal systems. . . ." It is known, however, that all of the solutions of the present invention are colloidal by standard tests because all display either Tyndal effects or light scattering when irradiated with appropriate radiant energy.

Specifically, white light irradiation of the colloidal wetting solutions of this invention containing relatively large colloidal particles produces the well-known Tyndal Cone (see the D. J. Shaw reference, supra). Other wetting solutions having relatively smaller colloidal particles may not produce the traditional Tyndal Cone, but will rather produce light scattering at an appropriate wavelength. This fact is borne out by the fact that the wetting solutions of this invention all exhibit a characteristic color. This color is due at least in part to the light scattering.

Alternatively, it may be stated that the solutions of this invention are those formed by hydrolysis and nucleation reactions to produce a stable suspension of hydrous oxide particles, in which particles the surface effects predominate over the bulk effects.

The selected element may be in the O valence state, i.e., may be selected in its elemental or metallic form. In this case, a salt of the selected element is later produced. On the other hand, a salt of the selected element may be initially chosen. In either event the following salts of the selected element are typical of the type of salts useable in this invention: the nitrates, sulfates, acetates, chlorides, bromides and iodides, the chlorides being usually preferred.

The salts here listed are not, however, the *only* salts useable in the present invention. The term "salt" as used herein, means any substance which yields ions, other than hydroxyl ions; the salt is obtained by displacing the hydrogen of an acid by a metal. Thus, the salt may be either an anionic or a cationic radical or complex.

Accordingly, *any* salt is theoretically useable in this invention, the *only* limitations thereon being that the salt not be so strongly complexed so as to prevent the desired hydrolysis and nucleation reactions and that such reactions lead to insoluble hydrous oxide colloidal particles.

The first limitation (i.e., that hydrolysis and nucleation not be prevented) is really meaningful only with respect to cation hydrolysis, e.g., most metals complexed with EDTA are not able to be hydrolyzed. This limitation does not apply to anion hydrolysis, because hydrolysis of the metal anion can nearly always be effected.

Next, the pH of an aqueous solution is adjusted, if necessary, to a value at which dissolution of the element or of its salt therein produces no precipitate or flocculate. If the elemental form of the selected element is added to the aqueous solution, production of the salt occurs in situ within the aqueous solution; that is, the salt in its solid, non-aqueous state may never have been isolated as such. Rather, the aqueous solution may contain an oxidizing agent or species, so that the dissolved salt is immediately formed. For example, hydrochloric acid may have been added to the aqueous solution in such a manner that a dissolved chloride (that is, the salt) of the selected element (in its element or O valence state form) is present. In any event, the pH of the solution is adjusted, if necessary, so that when the salt is dissolved therein, whether by addition of the salt itself or by the addition of the selected element in elemental form, no precipitate or flocculate is produced.

In many cases no pH adjustment is actually necessary after the addition of the selected element. Often the solution, immediately or after the passage of some time, adjusts itself to a pH level whereat the undesirable precipitate does not form. The need for pH adjustment is believed to be easily recognizable by one having ordinary skill in the art.

Next, a non-wettable surface is immersed in the colloidal solution. Such immersion effects deposition of the hydrous oxide particles onto the surface. Apparently, the particles reach the surface by Brownian movement and are retained thereby one or more short order effects, such as London Dispersion, Van der Waals, dispersion, hydrogen bonding, ionic, metallic, dipole, etc. forces.

The surface remains in the colloid solution until it is wet thereby and is then removed. The wetting of the surface may occur quite quickly or may require prolonged immersion of the surface in the colloid solution. Such wetting may be indicated by visually checking for practical wetting, that is, observing whether the surface retains a thin, continuous and uniform layer of the colloid solution where such surface was in contact with the colloid solution. Evidently, the deposited colloidal, hydrous oxide particles have a much higher surface energy than the surface. Accordingly, deposition of the particles on the surface, in effect, creates a "new surface" which may be wet by water.

The deposited particles adhere quite tenaciously to the surface. Repeated rinsings do not affect the wettability of the surface. It has been observed that surfaces rendered wettable by water by the method of this invention, are wettable (1) by all liquids having surface energies the same as or lower than water and (2) by some liquids of higher surface energy than water.

It is speculated that the reasons and mechanisms accounting for the operation of this invention may be partially explained by one or more of three possible theories.

First, it is speculated that the mechanism accounting for the present invention may be due to long range ordering effects. Specifically, the colloid wetting solutions are two phase systems generated by hydrolysis and nucleation reactions, which produce colloidal particles of the proper size and surface chemistry. Such particles strongly interact with the liquid medium of the wetting solution, here water. When a surface is placed in the solution, thermal fluctuations bring some of the particles close to the surface, which particles adhere thereto due to a favorable thermal situation. More specifically, due to the strong interaction of the particles with water, around each particle is highly ordered water, that is, a symmetrical hydration sphere. For some reason, when the thermal fluctuations bring the particles close to the surface, their hydration spheres are distorted, causing some of the ordered water to leave the particles. This decrease in the ordering of the water (i.e., the distortion of the hydration spheres) increases the entropy of the particles, while decreasing their energy. The increased entropy "drives" the adherence of the particles to the surface, decreasing further the free energy of the particles. Once the particles are adhered to the surface, their decreased free energy creates a situation wherein the particles are more likely to remain adhered to the surface than they are to detach therefrom. The remaining ordered water in the hydration sphere of each particle is of course, adhered to the surface with the adhered particles. Thus, the surface is wet. This theory is due, in part, to the observation that there is apparently insufficient entholpy in the wetting solution-surface system to cause the particles to adhere to the surface.

The second possible theory is much more simplistic and initially assumes that the small hydrous oxide particles move about in the liquid medium of the solution (Brownian movement). At times, such motion brings the particles close to the immersed hydrophobic surface—so close, in fact, that short order forces (those decreasing as the inverse of at least the third power of distance) permit the particles and the surface to interact. Such interaction leads to the particles adhering to the surface generating a "new" higher surface energy (i.e., the surface energy of the particles) surface which is hydrophilic.

The third possible theory may be viewed as a surface tension or surface energy theory. The hydrophobic surface has a low surface energy. Accordingly, a drop of high surface energy liquid, such as water, on the surface does not spread, but rather "beads up." This lack of spreading is due to the fact that the interaction between the surface and ambient vapor (e.g., air) is greater than the interaction between the surface and the liquid. When the surface is placed in a wetting solution, the hydrous oxide colloidal particles interact more strongly with the surface than does the aqueous portion of the solution. Thus, considering the surface—particle interfacial tension, the particles "wet" the surface due to their stronger interaction with the surface. The surface "wet" with the particles is a "new" surface which is hydrophilic.

The exact nature of all of the deposited particles is not well characterized. In some cases, high power magnification has revealed observable particulate matter on the surface. In most cases, however, after treatment, no discernable particles have been observed by high power magnification of the surface. However, in all cases, some form of the metallic species of the selected element or elements have been detected on treated surfaces by one or more of a variety of techniques including X-ray fluorescence, electron microscopy and micro-analytic chemistry. The molecular structure and stoichiometry of most of these metallic species are at present, unknown.

In some cases the stoichiometry of the metallic species deposited on the surface has been identified. However, treatment of surfaces with these stoichiometrically identified compounds not involving the controlled hydrolysis does not result in wetting. For example, Weiser (H. B. Weiser, Inorganic Colloid Chemistry, vol. II: "Hydrous Oxides and Hydroxides," John Wiley and Sons, Inc., New York (1935) describes a number of methods of producing a variety of hydrous oxides. Surfaces have been treated with Weiser's formulations; no wetting has been observed. For example, Weiser gives some formulations for making hydrous ionic oxides. None of these oxides produced wetting solutions, in contrast to Examples X–A through H, infra.

It is worthy of note that the effect of treatment of a surface with the subject solutions renders the surface wettable with no observable chemical or physical change of the surface. Thus, stoichiometric analysis of both the wetting solutions and (where possible) of the particles deposited on a treated surface indicates that no chemical changes can account for the effect described herein.

The broad aspects of the present invention have been described earlier. It has been noted that little is known of the precise operation of the solutions which constitute the present invention. Specifically, little is understood concerning the character of the particulate matter deposited from the solutions or of the mechanism by which such matter renders surfaces wettable. More specifically, aside from the fact that all of the elements capable of forming an insoluble hydrous oxide are useful in the subject wetting solutions, the most common denominator the solutions appear to have is the ability to render low surface energy solids wettable via hydrolysis and nucleation reactions, as previously described.

Numerous examples of such wetting solutions are set forth below. However, some of the observable properties of these solutions will first be discussed along with several anomalous observations which have been made.

A surface ordinarily wettable by a liquid, such as water, displays a certain affinity for the liquid. For example, a drop of water placed on a hydrophilic surface such as clean glass wets the surface. Moreover, rather than bead up, a drop of water placed on the glass will spread until the surface tension of the water balances the attractive wetting force between the water and the glass. Additionally, if a piece of clean glass or other ordinarily wettable surface is immersed in water, a positive meniscus is observed at the water-glass interface.

In contrast to the above-described situation the solutions of the present invention are anomalous.

Specifically, a drop of one of the wetting solutions of this invention placed on a low surface energy and ordinarily non-wettable surface does *not* spread and displays a rather high contact angle therewith. In fact, the contact angle is as high as, and sometimes higher than, ordinary water on the surface. Also, when non-wettable a surface is immersed in one of the solutions of the present invention, a *negative* meniscus at its point of contact with the solution is observed. Yet where the non-wettable surface is "forced" to remain in contact with the wetting solution for the necessary time, wetting is subsequently observed. It has, as a consequence, been determined that the wetting solutions of the present invention have surface tensions and energies as high as (and sometimes higher than) those of water.

As mentioned earlier, micrographs of surfaces treated with some of the present novel wetting solutions indicate that particulate matter is deposited thereon. These particles are quite discontinuous when viewed as a coating on the surface. In fact, the distance between most of the particles is much greater ($10\times$–$1000\times$) than the size of the average water molecule. Regardless, however, even with the treated surface so sparsely populated with apparently high surface energy colloidal particles, wetting occurs. This, it is possible, points to the long range ordering phenomenon, mentioned earlier.

It might be supposed that the electrical charge of the particles is the key to the deposition on and the strong attachment to the surface. Yet, the solutions have been observed to render both anionic and cationic surfaces wettable.

Another anomaly is presented by the fact that it is presently supposed that only hydrophilic, reversible colloids are capable of coacervating. The present colloidal solutions, which are hydrophobic and irreversible also coacervate.

EXAMPLES

The following are examples of the type of wetting solutions which may be produced by the present invention. Unless otherwise stated, all water used may be either plain tap water or deionized water (D.I. $H_2O$).

It should further be noted that dissolution of either the selected element, in its elemental form, or in the form of a salt may, where necessary, be effected by a univalent or a divalent acid. Typical of such acids are hydrochloric acid [$HCl$], nitric acid [$HNO_3$], sulphuric acid [$H_2SO_4$], or the like. These acids may, if necessary, be heated. Where upward pH adjustment is needed to form the desired colloid, any concentrated or dilute univalent alkali or base may be used. Typically, such alkalis are sodium hydroxide [$NaOH$], ammonium hydroxide [$NH_4OH$], potassium hydroxide [$KOH$], or the like.

In the examples below, the colors of most of the wetting solutions are given. Such colors are characteristic of the index of refraction of liquid phase of the colloid; the size of and amount of reflection from the colloid particles (the solid phase of the colloid); and the elements constituting each. The solutions may be illuminated in such a manner as to produce Tyndal effects or light scattering so that the onset of the colloidal state may be noted.

Because the solid phase of the novel wetting solutions of this invention comprises one or more hydrous oxides, in making the wetting solutions, a strong oxidizer, e.g., hydrogen peroxide [$H_2O_2$], may often be required.

The weights (in weight percent) of the selected element or elements (or the salts thereof) for each formulation are given below. Such weights are indicative of a range and are not intended to be exclusive. Typically, the weight percent of the selected element or of its salt may range from .2–5 weight percent.

(I) Beryllium [Be]

(A) ½ weight percent of beryllium chloride [$BeCl_2$] was added to and dissolved in 100 ml. of deionized water. (D.I. $H_2O$). The initial pH of 3.0 of the solution was raised with very dilute ($H_2O$ dilution of $\frac{1}{20}$) $NH_4OH$ until it was within the range of 5.6–5.8. A colorless (light, milky white) colloid wetting solution was produced.

(B) 1 weight percent of beryllium chloride [$BeCl_2$] was added to and dissolved in 100 ml. of D.I. $H_2O$. The initial pH was raised with $NaOH$ until it was about 5 whereat a Tyndal cone was observed. A colorless (e.g., light, milky white) wetting solution was produced. Beryllium sulphate [$BeSO_4.4H_2O$] and beryllium nitrate [$Be(NO_3)_2.3H_2O$] were used in a similar manner to produce a wetting solution.

(C) ¼–½ weight percent of beryllium chloride [$BeCl_2$] was added to D.I. $H_2O$. This solution was heated for about one hour at 70° C. A colorless (light, milky white) colloid wetting solution resulted.

(II) Magnesium [Mg]

(A) 1 weight percent of magnesium chloride [$MgCl_2$ or $MgCl_2.6H_2O$] was dissolved in 100 ml. of D.I. $H_2O$. The initial pH was raised with a univalent alkali to about 8. A colorless (light, milky white) wetting solution was produced.

(B) 1 weight percent of magnesium nitrate $$[Mg(NO_3)_2.6H_2O]$$

was dissolved in 100 ml. of D.I. $H_2O$. The initial pH was raised with a univalent alkali to about 8. A colorless (light, milky white) wetting solution was produced.

(III) Titanium [Ti]

(A) Particulated titanium metal [Ti°] was added to a hot or boiling (about 80° C.) concentrated univalent acid, such as HCl, until .2–3 weight percent of the titanium was dissolved. The solution was then allowed to cool to room temperature. The initial pH was slowly raised with a univalent alkali, such as NaOH, until it was within the range of about 1.0–1.5. A blue wetting solution was produced which wet Teflon® surfaces.

(B) Particulated titanium metal [Ti°] was added to a hot or boiling (about 80° C.) concentrated univalent acid, such as $HNO_3$, until .2–3 weight percent of the titanium was dissolved. After cooling to room temperature the initial pH was slowly raised with a univalent alkali, such as NaOH, until it was within the range of about 1.0–1.5. A blue wetting solution was produced which wet Teflon® surfaces.

(C) In either III–A or III–B, supra, prior to raising the pH, sufficient $H_2O_2$ was added to quantitatively render all the dissolved titanium [$Ti^{+3}$] to $Ti^{+4}$. Next, the pH was raised with a univalent alkali, such as NaOH until it was within the range of about 1.2–2.0. A yellow wetting solution was produced which wet Teflon® surfaces. Moreover, later deposited films and coatings of all types (polymer, metal, etc.) adhered extremely well to surfaces treated with this wetting solution.

(D) Particulated, anydrous titanium trichloride [$TiCl_3$] was added to a concentrated univalent acid diluted with D.I. $H_2O$ until 1 weight percent of the $TiCl_3$ was dissolved. The initial pH was raised to about 10 with a univalent alkali to produce a blue wetting solution. The colloidal particles deposited on a surface treated in this solution have been identified tentatively as $TiO_2$ anatase (or octahechite) by electron diffraction. The colloidal particles of only one other solution (Example X–B, infra) have also been as exactly identified.

(E) 1 gram of fused titanium metal [Ti°] was added to 70 ml. of concentrated HCl which was boiled until the solution assumed a pale blue color. Boiling was stopped but heat input was maintained until most or all of the titanium had dissolved and reacted, and a blue-purple solution resulted having a very low pH. The pH of the solution was then raised to about .5 with 1 N NaOH at which point a pale lavender solution resulted. Next, very dilute 50% $H_2O_2$ was added until the solution became colorless, at which time 1–2 drops more of the dilute 50% $H_2O_2$ were added. A light, but intense, amber solution resulted. The pH was then raised with 1 N NaOH to about 1.0–1.2. A murky, pale yellow wetting solution resulted.

(F) .1–5 weight percent of solid, particulated (~100 A.) titanium dioxide [$TiO_2$] was added to $H_2O$. A wetting solution requiring no pH adjustment resulted.

(G) .5–5 weight percent of titanium tetrachloride [$TiCl_4$] was added to concentrated HCl. The initial pH of this solution was slowly raised by the addition thereto of $H_2O$ or a dilute base, such as, NaOH or $NH_4OH$. At a pH of .5–1.5 a solution which wet Teflon® resulted. When the initial pH of the initial solution was low, heating produced a wetting colloid solution.

(IV) Zirconium 1 weight percent of zirconyl chloride [$ZrOCl_2.8H_2O$] was dissolved in 100 ml. of D.I. $H_2O$. When the initial pH of the solution was <1, the solution was either heated or had added thereto NaOH until the pH was about 1.4–2. If the initial pH was >1, the pH was lowered to 1 or less with a univalent acid; next either heat or NaOH added until the pH was about 1.4–2. A colorless (light, milky white) solution capable of wetting at least polyethylene resulted.

(V) Vanadium (A) 1 weight percent of vanadium metal [V°] was dissolved in 100 ml. of a hot or boiling concentrated univalent acid, such as $HNO_3$. A blue solution resulted, the pH of which was raised to about 1.5–2 with a univalent alkali. The solution was heated and a small amount of $H_2O_2$ was added thereto to yield a red-brown wetting solution. The same procedure may be followed using 1 weight percent of vanadium oxychloride [VOCl].

(B) 1 weight percent of sodium vanadate [$NaVO_3$], potassium vanadate [$KVO_3$] or ammonium meta-vanadate [$NH_4VO_3$] was dissolved in 100 ml. of D.I. $H_2O$. The initial alkaline pH of this solution was slowly lowered to a pH of about 5–6 by adding HCl. The resulting red-brown colloidal solution is wetting.

(C) ½ weight percent of vanadium tetrachloride [$VCl_4$] was added to concentrated HCl. The pH was slowly raised to about 1, e.g. by diluting with $H_2O$ to produce a brown-red colloid wetting solution.

(VI) Chromium

½ weight percent of a green chromic chloride [$CrCl_3.6H_2O_2$ but probably more properly $$(Cr(H_2O)_4Cl_2)Cl.2H_2O$$

or $$(Cr(H_2O)_5Cl)Cl_2.H_2O]$$

was dissolved in 100 ml. of D.I. $H_2O$. The initial pH was raised to about 5 with a univalent alkali to obtain a green solution which wet at least polyethylene.

(VII) Molybdenum 1 weight percent of a sodium molybdate [which may be $Na_2MoO_4.2H_2O$ or $Na_4(6Mo_7O_{24}).4H_2O$] was dissolved in 100 ml. of D.I. $H_2O$. The initial pH was lowered with a univalent acid to just below about 7 to produce a slightly yellow wetting solution.

(VIII) Tungsten 1 to 5 weight percent of sodium tungstate dihydrate [$Na_2WO_4.2H_2O$] was dissolved in 100 ml. of D.I. $H_2O$. The pH was lowered with a univalent acid such as HCl to <1. A faint yellow wetting solution resulted.

(IX) Manganese (A) 1 weight percent of potassium permanganate [$KMnO_4$] was dissolved in 100 ml. of hot, concentrated $HNO_3$. Heating was terminated when a Tyndal cone was first observed. A wetting solution capable of wetting Teflon® resulted.

(B) 1 weight percent of manganese trichloride [$MnCl_3$] was dissolved in sufficient HCl to produce a solution having a pH of about .5–2. Excess $H_2O_2$ was then added. The solution was heated and the pH raised to .6–.8 with NaOH. A dark, muddy brown wetting solution resulted. This same procedure may be followed using manganese dichloride or scacchite [$MnCl_2$] to produce a wetting solution.

(X) Iron (A) 1 weight percent of ferric chloride [$FeCl_3.6H_2O$] was dissolved in 100 ml. of D.I. $H_2O$. Dissolution was aided by gradually heating to about 50°–80° C. and stirring. At a pH of about 1.7–1.9 a tan wetting solution was produced.

(B) .5–5% of ferric chloride [$FeCl_3.6H_2O$] was dissolved in 100 ml. of D.I. $H_2O$. The final pH of this solution was adjusted to about 1.5–2.0 with either HCl (at low $FeCl_3$ concentrations) or NaOH (at high $FeCl_3$ concentrations). The solution was heated to 70° C. within 20 minutes. A coffee-pumpkin color wetting solution resulted. Only the colloidal particles deposited on a treated substrate from this solution (β-FeOOH) and from Example III-D have been identified by electron diffraction.

(C) 1.5 weight percent of ferric chloride (FeCl$_3$.6H$_2$O) was dispersed in 100 ml. of D.I. H$_2$O to a final pH of about 1.7–1.9. The solution was allowed to stand in ambient for 1–2 weeks. A coffee-pumpkin color wetting solution resulted. While this same general approach was also successful with the nitrates, et al., it was not successful with the acetates of iron.

(D) Examples X–B and C were also successfully tried using an acetate of iron [Fe(C$_2$H$_3$O$_2$).4H$_2$O], except as noted in Example X–C; a nitrate of iron

[Fe(NO$_3$)$_2$.6H$_2$O or Fe(NO$_3$)$_3$.6H$_2$O) or Fe(NO$_3$)$_3$.9H$_2$O];

or a bromide of iron [FeBr$_3$, FeBr$_2$ or FeBr$_3$.6H$_2$O]. The acetate solution contained an excess of acetic acid and required heating to 60° C. for 1 hour. All trials resulted in a coffee-pumpkin color wetting solution.

(E) 100 ml. of D.I. H$_2$O was first heated to 70° C. ½–5 weight percent of ferric chloride [FeCl$_3$.6H$_2$O] was added thereto and dissolved therein. The final pH of this solution was 1.5–2.0 and was green. A similar solution was also produced with ferric nitrate [Fe(NO$_3$)$_3$.6H$_2$O]. Both formulations resulted in wetting solutions and the 1 weight percent solution of ferric chloride wet Teflon®.

(F) Ferric oxide or hematite [Fe$_2$O$_3$] was particulated and powdered to a particle size of about 150 A. and 1 weight percent thereof was added to 100 ml. of D.I. H$_2$O. The solution was ultrasonically agitated to aid in the dissolution of the Fe$_2$O$_3$. The pH of this solution was then either lowered from 3–3.5 to 1.0 with a univalent acid such as HCl or was raised to 11 with a univalent alkali. A wetting solution was produced in both cases.

(G) Ferrous oxide or magnetite [Fe$_3$O$_4$] was particulated and powdered to a particle size of about 150 A. and 1 weight percent thereof was added to 100 ml. of D.I. H$_2$O. The solution was ultrasonically agitated to aid in the dissolution of the Fe$_3$O$_4$. The initial pH of about 3.0–3.5 of this solution was then lowered with a univalent acid such as HCl to about 1.0. A wetting solution resulted.

(H) 100 ml. of D.I. H$_2$O was heated to 80° C. 1–2 weight percent of the ferric chloride [FeCl$_3$.6H$_2$O] was added and the solution was stirred until the ferric chloride dissolved. The solution was allowed to cool to room temperature. A vermouth colored wetting solution resulted.

(XI) Cobalt (A) 1 weight percent of cobaltous chloride

[CoCl$_2$.6H$_2$O]

was added to 100 ml. of D.I. H$_2$O to form a rose colored solution having a pH of about 4.9–5.1. The pH was then raised with 1 N NaOH to about 7.0–7.2. A blue wetting solution was thereby produced.

(B) 1 weight percent of cobaltous chloride

[CoCl$_2$.6H$_2$O]

was added to 100 ml. of D.I. H$_2$O. Sufficient NaOH was added to effect the onset of a Tyndal cone. The solution was then heated to about 60°–70° C. for two days, the pH being adjusted, as necessary, with NaOH to about 4. A pink colored wetting solution resulted.

(C) 1 weight percent of cobaltous chloride

[CoCl$_2$.6H$_2$O]

was added to 100 ml. of D.I. H$_2$O. The solution was heated to about 60°–70° C. and was constantly stirred. During the constant stirring the pH was raised to about 2 with NaOH. The solution was again heated and the pH again raised to about 2. This procedure was continued until the onset of a Tyndal cone or for about 6 hours. A wetting solution having a life of about 1 hour was produced.

(XII) Nickel (A) 1 weight percent of nickel chloride [NiCl$_2$.6H$_2$O] was dissolved in 100 ml. of D.I. H$_2$O. Sufficient NaOH was then added to effect the onset of a Tyndal cone. The solution was then heated at about 60°–70° C. for 2 days keeping the pH adjusted to about 4 with NaOH. A green wetting solution resulted.

(B) 1 weight percent of nickel chloride [NiCl$_2$.6H$_2$O] was dissolved in D.I. H$_2$O, producing a solution of pH about 5. The pH was raised to about 6–6.5 with NaOH. A pale green wetting solution resulted.

(XIII) Palladium (A) 1 weight percent of palladium chloride [PdCl$_2$] was added in 100 ml. of D.I. H$_2$O. This mixture was stirred until the maximum amount of PdCl$_2$ was dissolved. The final pH of this solution was about 2.7 and drifted downward. A dark murky brown solution which wets at least polyethylene resulted.

(B) 10 ml. of 5% stock solution (i.e., .5 weight percent) of palladium chloride [PdCl$_2$] was added to 100 ml. of D.I. H$_2$O. The initial pH of this solution is raised with dilute 1 N NaOH to a pH of about 3.0–3.2. A brown wetting solution resulted.

(XIV) Platinum 1 weight percent of platinous dichloride [PtCl$_2$] was dissolved in 100 ml. of hot (70° C.), dilute HCl. After cooling to room temperature the pH of this solution was raised to about 3 with a univalent alkali. A yellow wetting solution resulted.

(XV) Copper 1 weight percent of cupric chloride [CuCl$_2$] was dissolved in 100 ml. of D.I. H$_2$O. The solution was heated to about 70° C. while the pH was continually adjusted, where necessary, to about 6 with NaOH. After about 60 minutes of heating a deep blue wetting solution resulted.

(XVI) Silver

¼–½ weight percent of silver nitrate [AgNO$_3$] was dissolved either in 100 ml. of D.I. H$_2$O or in 100 ml. of 50% D.I. H$_2$O and 50% ethyl alcohol. This solution was rather unstable and the pH thereof must be rapidly raised to about 7 with a univalent alkali, such as KOH or NaOH. Next, the pH of the solution was slowly raised with the same acid to within the range of about 8–9. A colorless (milky white) wetting solution resulted.

(XVII) Gold (A) 1 weight percent of auric chloride [AuCl$_3$] was dissolved in 100 ml. of D.I. H$_2$O to produce a yellow solution, the pH of which was slowly raised (e.g., over a period of 2 days) to about 4–5 with a univalent alkali. During the raising of the pH, the solution was continuously stirred and was slightly heated to about 30°–40° C. A brown solution capable of wetting at least polyethylene resulted.

(B) ½–1 weight percent of auric chloride [AuCl$_3$] was dissolved in 100 ml. of D.I. H$_2$O. The H$_2$O and HCl in the solution was permitted to evaporate in ambient slowly over a period of 2–4 weeks (or at reduced pressure for a shorter time), until about ⅕ of the volume of the original solution remains. A golden yellow solution capable of wetting Teflon® resulted.

(C) 1 weight percent of auric chloride [AuCl$_3$] was dissolved in 100 ml. D.I. H$_2$O. The pH of this solution was raised very slowly with NaOH to about 4 where the solution became a cloudy brown wetting solution.

(XVIII) Zinc 1 weight percent of zinc chloride [$ZnCl_2$] was dissolved in 100 ml. of D.I. $H_2O$. A sufficient amount of a univalent acid, such as NaOH, was added to effect a slight precipitate at a pH of about 4. The solution was heated at 60°–80° C. until the precipitate dissolved. Next, a dilute univalent alkali such as NaOH, was added until the onset of a colloidal phase in the solution as detected by the onset of a Tyndal cone. The heating and acid addition steps were repeated until a colorless (milky white) wetting solution resulted.

(XIX) Cadmium 1 weight percent of cadmium chloride [$CdCl_2.2\frac{1}{2}H_2O$] was dissolved in 100 ml. of D.I. $H_2O$. The pH of this solution was very slowly (over several hours time) raised to about 8–9 with a very dilute univalent alkali, such as NaOH, during which time the solution was slightly (about 30°–40° C.) heated. A colorless (milky white) wetting solution resulted.

(XX) Mercury 1 weight percent of mercuric chloride (corrosive sublimate) [$HgCl_2$] was dissolved in 100 ml. of D.I. $H_2O$. A dilute univalent alkali, such as NaOH, was slowly added to raise the pH to about 5. This solution was stirred for several minutes until a vaguely yellow wetting solution resulted.

(XXI) Aluminum (A) 1 weight percent of finely powdered aluminum chloride [$AlCl_3$] was added to 100 ml. of D.I. $H_2O$. The pH was raised with a univalent alkali, such as NaOH, to about 5.2. This solution was heated for about 2 hours at about 60°–80° C. A colorless (milky white) wetting solution resulted.

(B) 100 ml. of D.I. $H_2O$ was heated to about 60° C. To the $H_2O$ was added 1 weight percent of aluminum chloride [$AlCl_3.6H_2O$]. The initial pH (about 2.5) was raised to about 5.0–5.2 while the solution was still hot with a univalent alkali, such as 1 N NaOH. A cloudy white wetting solution resulted.

(XXII) Indium (A) 1 weight percent of indium trichloride [$InCl_3$] was dissolved in 100 ml. of D.I. $H_2O$. The pH of this solution was raised to about 3 with NaOH. A colorless (milky white) wetting solution resulted.

(B) ½ weight percent of indium monochloride [$InCl$] was dissolved in 100 ml. of D.I. $H_2O$. The initial pH (N 3.5) of this solution was slowly (preferably by dropwise addition) raised with very dilute (factor of 20 with $H_2O$) $NH_4OH$ to a pH of about 3.9 until a whitish wetting solution resulted.

(XXIII) Thallium

.1 weight percent either of thallous nitrate [$TlNO_3$] or of thallium monochloride [$TlCl$] was added to 100 ml. of D.I. $H_2O$. The pH of this was raised to about 7.5–8 with NaOH. Next, a few ml. of dilute of potassium ferricyanide [$K_3Fe(CN)_6$] was added while the solution was stirred. A yellow solution which wet Teflon® was produced which had a life of about ½ hour. Surfaces treated in this solution appear to have deposited thereon, in being rendered wettable, a thick coating of some thallous compound. This coating is about $10^3$ A. thick and is practically impossible to remove from the surface by abrasion or any other mechanical means.

(XXIV) Silicon

.1–5 weight percent of silicon tetrachloride or tetrachlorosilane [$SiCl_4$] was added to concentrated HCl. Dissolution was effected by stirring the solution. The solution was allowed, during stirring, to slowly go through its normal hydrolysis, during which the $SiCl_4$ slowly reacted. It is assumed that colloidal $SiO_2$ was thereby formed. A colorless solution which wet Teflon® was thereby produced. At high (N 5) weight percentages of $SiCl_4$, a wetting gel was produced.

(XXV) Germanium 1 to 2 weight percent of germanium tetrachloride [$GeCl_4$] was added to concentrated HCl. The solution was diluted with $H_2O$ and the pH thereof was raised to about .5. A colloid wetting solution resulted.

(XXVI) Tin (A) 1–3 weight percent of stannic chloride [$SnCl_4.5H_2O$] was dissolved in 100 ml. of D.I. $H_2O$. The solution was allowed to stand at room temperature for 1–3 days or at an elevated temperature (∼60° C.) for about 1 hour, until a flocculate was formed. The supernatant portion of this solution was a colorless solution.

(B) ½–2 weight percent stannic chloride [$SnCl_4.5H_2O$] is dissolved in 100 ml. of D.I. $H_2O$. This solution was allowed to stand for about 1 month until the pH thereof was about .8–1.8 and a flocculate formed at the bottom thereof. The supernatant portion of this solution was colorless (milky white) and wets Teflon®.

(C) The bottom layer (containing the flocculate) of the solution of Example XXVI-B had added thereto sufficient HCl to lower the pH to about .8–1.8. A colorless (milky white) solution capable of wetting Teflon® resulted.

(D) The bottom layer (containing the flocculate) of the solution of Example XXVI-B was heated to 30°–90° C. for about 30 minutes. A colorless wetting solution was thereby produced.

(E) 1 weight percent of sodium hydroxo-stannate

[$Na_2SnO_3.3H_2O$ or $Na_2Sn(OH)_6$]

was dissolved in 100 ml. of D.I. $H_2O$. The initial pH of this solution was lowered to about 7.5–8.5 by the slow addition of HCl. A colorless (milky white) wetting solution was produced which was above the isoelectric point.

(F) 100 ml. of D.I. $H_2O$ had dissolved therein (1) .1–5 weight percent of stannous chloride [$SnCl_2$] and (2) .1–5 weight percent (with respect to the $H_2O$) of stannic chloride [$SnCl_4$] in any proportion to each other. If required, the pH was adjusted to about .7–1.8. A pale yelow wetting solution was produced.

(G) 1 weight percent of stannic chloride [$SnCl_4.5H_2O$] in powder form was added to 100 ml. of D.I. $H_2O$ and the solution stirred until the $SnCl_4$ dissolved. Next, 2 weight percent of stannous chloride [$SnCl_2.2H_2O$] was added to the solution which was stirred until the $SnCl_2$ was dissolved. Lastly, 1.5 weight percent stannous chloride [$SnCl_2.2H_2O$] was added, and stirring was effected until dissolved. A pale yellow wetting solution resulted.

(H) 1 weight percent of stannous chloride [$SnCl_2.2H_2O$] was dissolved in 100 ml. of D.I. $H_2O$. Sufficient HCl was added to lower the pH to about .5–1.5. The solution was then heated at about 55° C. for 2 hours until a pale yellow wetting solution was produced. $H_2O_2$ was also added in place of or in addition to the heating step to produce a similar wetting solution.

(I) To concentrated HCl was added 1–2 weight percent of stannic chloride [$SnCl_4$]. The initial low pH of this solution was raised to within the range .5–.8 with NaOH. A colloidal wetting solution resulted.

(XXVII) Lead 1 weight percent of either lead chloride [$PbCl_2$] or lead nitrate [$Pb(NO_3)_2$] was dissolved in 100 ml. of D.I. $H_2O$. The initial pH of this collection was slowly raised with a dilute univalent alkali, such as, NaOH, to a pH of about 6–7. A colorless (milky white) wetting solution resulted.

(XXVIII) Bismuth 1 weight percent of bismuth trichloride [$BiCl_3$] was dissolved in 100 ml. of dilute (pH about .2) HCl. The pH of this solution was raised with NaOH to about 3–4. A colorless (milky white) wetting solution resulted.

(XXIX) Lanthanum 1 weight percent of lanthanum nitrate [$La(NO_3)_3 \cdot 6H_2O$] was dissolved in 100 ml. of D.I. $H_2O$. The initial pH of this solution was raised to about 3 with a univalent alkali. A colorless (milky white) wetting solution resulted.

(XXX) Cerium (A) A 5 percent solution of cerous nitrate

[$Ce(NO_3)_3 \cdot 6H_2O$]

was formed in D.I. $H_2O$. The initial pH of this solution was raised to about 7.4 with 1 N NaOH. A wetting solution was thereby produced.

(B) A 5 percent solution of nitratocerate (ceric ammonium nitrate) [$(NH_4)_2[Ce(NO_3)_6]$] was formed in D.I. $H_2O$. The initial pH ($\sim$1.7–1.8) of this solution was raised to about 2.2 with dilute $NH_4OH$. A wetting solution resulted.

(XXXI) Thorium 1 weight percent of thorium chloride [$ThCl_4$] was dissolved in 100 ml. of D.I. $H_2O$. A univalent alkali, such as NaOH, was slowly added to raise the pH to about 4. A colorless (milky white) wetting solution resulted.

(XXXII) Uranium 1 weight percent of uranyl nitrate [$UO_2(NO_3)_2 \cdot 6H_2O$] was dissolved in 100 ml. of D.I. $H_2O$. NaOH was slowly added to raise the pH to about 1.5–2.4. A yellow wetting solution was thereby produced.

(XXXIII) Mixtures (A) To 100 ml. of the wetting solution of Example III–E, 1 weight percent stannous chloride [$SnCl_2 \cdot 2H_2O$] was added. A photosensitive wetting solution resulted.

(B) Dissolved in 100 ml. of the solution of Example X–A was 2 weight percent stannous chloride

[$SnCl_2 \cdot 2H_2O$]

which lowered the pH to about 1.5. A pumpkin colored, photosensitive wetting solution resulted.

(C) .1 weight percent of stannous chloride

[$SnCl_2 \cdot 2H_2O$]

was dissolved in the solution of Example XXI–B after the original solution was cooled to room temperature. A photosensitive wetting solution resulted.

(D) 1 weight percent of ferric chloride [$FeCl_3 \cdot 6H_2O$] and 1 weight percent of stannous chloride

[$SnCl_2 \cdot 2H_2O$]

were dissolved with stirring in 100 ml. of D.I. $H_2O$. A pale yellow color wetting solution having a final pH of about 1.4–1.5 resulted.

(E) The wetting solution of Example XXXIII–D was dialyzed to a final pH of about 5–5.5. A pale yellow colloid wetting solution, above the isoelectric point, resulted. At a pH of 5–5.5 this solution was quite close to the isoelectric point of tin oxide. A mossbauer spectrum of the solution indicated that the solid phase of the colloid was mostly tin (75% $SnO_2$; 25% SnO) with iron present at a low level. It is possible that the solid phase is tin oxide with sorbed $Fe^{+3}$ therein. The +3 charge prevents flocculation of the particles.

(F) 1 weight percent of stannous chloride [$SnCl_2 \cdot 2H_2O$] was added to a suspension of Cab-O-Sil® in 100 ml. of D.I. $H_2O$. A colorless (milky white) wetting solution resulted. Cab-O-Sil® is Cabot Corporation's trademark for a fumed silica made by flame hydrolysis. Solutions containing only Cab-O-Sil in suspension were not wetting solutions.

(G) 1–2 weight percent of stannic chloride

[$SnCl_4 \cdot 5H_2O$]

was dissolved in 100 ml. of D.I. $H_2O$. Next 1–5 weight percent of zinc metal was added and the solution was stirred for about one day or until the zinc dissolved. A yellow colored wetting solution resulted.

(H) 1 weight percent of ferric chloride [$FeCl_3$] was dissolved in 100 ml. of D.I. $H_2O$ by stirring. 1 weight percent of stannous chloride [$SnCl_2 \cdot 2H_2O$] was then dissolved in the solution by stirring. At a pH of about 1.5 a yellow colored wetting solution resulted.

(I) The solution of Example XXXIII–H was dialyzed in running water for 2–3 days to a final pH of 5.5–6.5. A milky yellow wetting solution resulted. Dialysis was also effected in standing water, the water being changed every day, for 3 days to a final pH of 5.6. A yellow wetting solution was thereby produced.

(J) 1–3 weight percent of stannous chloride

[$SnCl_2 \cdot 2H_2O$]

was dissolved in 100 ml. of D.I. $H_2O$. Sufficient HCl was added to clear the solution; the final pH of the cleared solution was .5–1.0. About 1 weight percent of zinc metal was added and dissolved by stirring. A yellow wetting solution results.

(K) .5% of chromic chloride [$CrCl_3 \cdot 6H_2O$] was dissolved in 100 ml. of D.I. $H_2O$. There was produced a solution having a pH which ranged from 3.0–3.5 and which had a rich transparent green color. Next, .25 weight percent of zinc metal (30 mesh) was added to the solution. The pH remained approximately the same; the color of the solution now ranged from an emerald green to a blue-green color. The solution was allowed to stand in ambient for at least 48 hours after which stannous chloride [$SnCl_2 \cdot 2H_2O$] was added to the solution in a weight concentration of .1% per 100 ml. The pH of the solution dropped to the range 2.3–2.5. Next, there was added slowly 1 N NaOH to the solution while stirring took place. Sufficient NaOH was added to adjust the pH to the range 5.1–5.4. A green wetting solution resulted which was quite resistant to the undercutting action of gold electroplating baths.

(L) The wetting solution of Example XXI–A was added .5–2 weight percent of stannous chloride

[$SnCl_2 \cdot 2H_2O$]

A flocculant formed. The supernatant portion of the solution was decanted and was a colloid wetting solution. The flocculant formed a wetting solution when .01 M HCl was added thereto.

(M) 1 to 2 weight percent stannous chloride

[$SnCl_2 \cdot 2H_2O$]

was dissolved in 1 M HCl. About .5 weight percent of palladium chloride [$PdCl_2$] was dissolved in 1 M HCl. The two solutions were intermixed and had added thereto .5 M NaOH until the pH was in the range .8–1.5. A solution which wet Teflon® resulted.

(N) 1 to 2 weight percent palladium chloride [$PdCl_2$] was dissolved in 1 M HCl. To this first solution was added about 2 weight percent stannic chloride [$SnCl_4 \cdot 5H_2O$]. About .3 weight percent stannous chloride [$SnCl_2 \cdot 2H_2O$] was dissolved in 1 M HCl to produce a second solution. The two solutions were intermixed and the pH of the mixture was slowly raised to about 1 with .5 M NaOH. A solution which wet Teflon® resulted.

It is to be understood that the above-described embodiments are simply illustrative of the principles of the invention. Various other modifications and changes may be devised by those skilled in the art which will embody the principles of the invention and fall within the spirit and scope thereof.

What is claimed is:

1. A method of forming a solution capable of rendering a non-wettable surface wettable, comprising:
   dissolving a salt selected from the group consisting of (a) a stannic chloride, (b) a hydroxo stannate, and (c) a mixture of a stannic chloride and a stannous chloride, in an aqueous medium to form an aqueous salt solution;
   forming a colloidal solution comprising insoluble hydrous oxide particles of tin, in at least one of its oxidation states, said particles having dimensions ranging from 10 A. to 10,000 A., including at least the sub-steps of:
   (1) effecting a hydrolysis and nucleation reaction of said dissolved salt in said aqueous salt solution; and
   (2) maintaining the pH of said aqueous salt solution at a value ranging from ($a^1$) about 0.5 to 1.8 when said salt comprises (a) above, ($b^1$) about 7.5 to 8.5 when said salt comprises (b) above, and ($c^1$) about 0.5 to 1.8 when said salt comprises (c) above.

2. A method of producing a solution capable of rendering a non-wettable surface wettable comprising the steps of:
   (a) dissolving a sufficient amount of a selected chromic salt in water to form a first solution having a pH ranging from 3.0 to 3.5;
   (b) adding an amount of zinc metal to said first solution to form a second solution having a pH ranging from 3.0 to 3.5;
   (c) aging said second solution;
   (d) adding a sufficient amount of a selected stannous salt to said second solution to form a third solution having a pH ranging from 2.3 to 2.5; and
   (e) adjusting the pH of said third solution to a range of about 5.1 to 5.4 to form a colloidal solution comprising insoluble hydrous oxide particles of at least one element selected from the group consisting of a Cr, Zn, and Sn, said particles having dimensions ranging from 10 A. to 10,000 A.

References Cited

UNITED STATES PATENTS

| | | | |
|---|---|---|---|
| 3,198,743 | 8/1965 | MacCallum et al. | 252—313 R |
| 2,696,474 | 12/1954 | Heard | 252—313 RX |
| 2,671,758 | 3/1954 | Vinograd et al. | 252—309 X |
| 2,657,183 | 10/1953 | Bechtold | 252—313 S |
| 3,271,327 | 9/1966 | McEvoy et al. | 260—460 X |

RICHARD D. LOVERING, Primary Examiner

U.S. Cl. X.R.

106—1, 286; 117—34, 47 R, 213; 204—30, 46; 252—62.56, 301.1 S, 313 S, 314